United States Patent
Shah et al.

(10) Patent No.: US 11,082,472 B2
(45) Date of Patent: Aug. 3, 2021

(54) METHODS, SYSTEMS AND MEDIA FOR ASSOCIATING MULTIPLE USERS WITH A MEDIA PRESENTATION DEVICE

(71) Applicant: Google Inc., Mountain View, CA (US)

(72) Inventors: Raunaq Shah, San Francisco, CA (US); Matt Van Der Staay, San Jose, CA (US)

(73) Assignee: Google LLC, Mountain View, CA (US)

( * ) Notice: Subject to any disclaimer, the term of this patent is extended or adjusted under 35 U.S.C. 154(b) by 416 days.

(21) Appl. No.: 15/319,304

(22) PCT Filed: Jun. 24, 2015

(86) PCT No.: PCT/US2015/037524
§ 371 (c)(1),
(2) Date: Dec. 15, 2016

(87) PCT Pub. No.: WO2015/200540
PCT Pub. Date: Dec. 30, 2015

(65) Prior Publication Data
US 2017/0139925 A1 May 18, 2017

Related U.S. Application Data

(60) Provisional application No. 62/016,421, filed on Jun. 24, 2014, provisional application No. 62/016,580, (Continued)

(51) Int. Cl.
*G06F 16/00* (2019.01)
*H04L 29/06* (2006.01)
(Continued)

(52) U.S. Cl.
CPC .............. *H04L 65/607* (2013.01); *G06F 3/14* (2013.01); *G06F 16/285* (2019.01);
(Continued)

(58) Field of Classification Search
CPC .... G06F 16/00; G06F 16/435; G06F 16/4393; G06F 16/285; G06F 16/438
See application file for complete search history.

(56) References Cited

U.S. PATENT DOCUMENTS

| 6,530,083 B1 | 3/2003 | Liebenow |
| 8,566,370 B2 | 10/2013 | Jin et al. |

(Continued)

FOREIGN PATENT DOCUMENTS

| CN | 101662619 | 3/2010 |
| CN | 102541257 | 7/2012 |

(Continued)

OTHER PUBLICATIONS

International Preliminary Report on Patentability and Written Opinion dated Jan. 5, 2017 in International Patent Application No. PCT/US2015/035724.

(Continued)

*Primary Examiner* — Khanh B Pham
(74) *Attorney, Agent, or Firm* — Byrne Poh LLP

(57) ABSTRACT

Methods, systems, and media for associating multiple users with a media presentation device are provided. In some embodiments, the method comprises: receiving first user preferences; receiving second user preferences; receiving requests to associate the first user preferences and the second user preferences, respectively, with a media presentation device; causing the first user preferences and the second user preferences to be associated with identifying information of the media presentation device; receiving, from the media presentation device, a request to present a slideshow of images based on user preferences and identifying information of the first user device and a third user device; determining that the first user preferences are associated with the media presentation device; determining that user preferences of the third user device are not associated with the (Continued)

media presentation device; and causing content based on the first user preferences to be presented by the media presentation device.

21 Claims, 7 Drawing Sheets

Related U.S. Application Data filed on Jun. 24, 2014, provisional application No. 62/016,575, filed on Jun. 24, 2014, provisional application No. 62/016,428, filed on Jun. 24, 2014.

(51) Int. Cl.
| | | |
|---|---|---|
| *G06F 16/28* | (2019.01) | |
| *G06F 16/435* | (2019.01) | |
| *G06F 16/438* | (2019.01) | |
| *H04L 29/08* | (2006.01) | |
| *G06F 3/14* | (2006.01) | |
| *G06F 3/0481* | (2013.01) | |

(52) U.S. Cl.
CPC ......... *G06F 16/435* (2019.01); *G06F 16/438* (2019.01); *G06F 16/4393* (2019.01); *H04L 67/306* (2013.01); *H04L 67/34* (2013.01); *G06F 3/0481* (2013.01)

(56) References Cited

U.S. PATENT DOCUMENTS

| | | | |
|---|---|---|---|
| 8,819,033 B2 | 8/2014 | Itakura | |
| 2007/0105588 A1 | 5/2007 | Issa | |
| 2010/0053149 A1 | 3/2010 | Inoue et al. | |
| 2012/0011558 A1* | 1/2012 | Maddali | G06Q 30/00 |
| | | | 725/131 |
| 2012/0072944 A1 | 3/2012 | Felt et al. | |
| 2012/0108293 A1* | 5/2012 | Law | G06F 16/4393 |
| | | | 455/557 |
| 2012/0124456 A1* | 5/2012 | Perez | G06Q 30/02 |
| | | | 715/200 |
| 2012/0162537 A1 | 6/2012 | Maddali et al. | |
| 2012/0294520 A1 | 11/2012 | Mei et al. | |
| 2013/0083049 A1 | 4/2013 | Mizuno | |
| 2013/0144915 A1* | 6/2013 | Ravi | G06F 16/437 |
| | | | 707/785 |
| 2014/0075385 A1* | 3/2014 | Wan | G06Q 10/1093 |
| | | | 715/812 |
| 2014/0337697 A1* | 11/2014 | Ryu | H04L 67/06 |
| | | | 715/205 |

FOREIGN PATENT DOCUMENTS

| | | |
|---|---|---|
| CN | 102741842 | 10/2012 |
| CN | 103198084 | 7/2013 |
| CN | 103562911 | 2/2014 |
| WO | WO 2011069035 | 6/2011 |
| WO | WO 2012064565 | 5/2012 |

OTHER PUBLICATIONS

International Search Report and Written Opinion dated Oct. 7, 2015 in International Patent Application No. PCT/US2015/037524.
Examination Report dated May 15, 2019 in EP Patent Application No. 15736120.5.
Office Action dated Sep. 16, 2019 in CN Patent Application No. 201580034269.4.
Office Action dated Feb. 10, 2020 in CN Patent Application No. 201580034269.4.
Summons to Attend Oral Proceedings dated May 20, 2020 in Europoean Patent Application No. 15736120.5.
Examination Report dated Sep. 24, 2020 in IN Patent Application No. 201647041501.
Decision to Refuse a Europoean Patent Application dated Mar. 15, 2021 in EP Patent Application No. 15736120.5.

\* cited by examiner

METHODS, SYSTEMS AND MEDIA FOR ASSOCIATING MULTIPLE USERS WITH A MEDIA PRESENTATION DEVICE

CROSS-REFERENCE TO RELATED APPLICATIONS

This application claims the benefit of U.S. Provisional Patent Application No. 62/016,421, filed Jun. 24, 2014, U.S. Provisional Patent Application No. 62/016,428, filed Jun. 24, 2014, U.S. Provisional Patent Application No. 62/016,575, filed Jun. 24, 2014, and U.S. Provisional Patent Application No. 62/016,580, filed Jun. 24, 2014. Each of the above-referenced patent applications is hereby incorporated by reference herein in its entirety.

TECHNICAL FIELD

The disclosed subject matter relates to methods, systems, and media for associating multiple users with a media presentation device.

BACKGROUND

Media presentation devices that present background content, such as a slideshow of images, can access the content from a user account by receiving and storing a username and password of the user account. The username and password are used to retrieve content associated with the account, which is then presented by the media presentation device. However, this requires user credentials to be stored by the media presentation device and also is limited to presenting content of only one user.

Accordingly, new methods, systems, and media for associating multiple users with a media presentation device are desirable.

SUMMARY

In accordance with some implementations of the disclosed subject matter, mechanisms for associating multiple users with a media presentation device are provided.

In accordance with some implementations of the disclosed subject matter, a method for determining content to be presented is provided, the method comprising: receiving, using a hardware processor, first user preferences associated with a first user; receiving, using the hardware processor, second user preferences associated with a second user; receiving, from a first user device, a request to associate the first user preferences with a media presentation device; in response to the request to associate the first user preferences with the media presentation device, causing the first user preferences to be associated with identifying information of the media presentation device; receiving, from a second user device, a request to associate the second user preferences with the media presentation device; in response to the request to associate the second user preferences with the media presentation device, causing the second user preferences to be associated with identifying information of the media presentation device; receiving, from the media presentation device, a request to present a slideshow of images based on user preferences associated with the media presentation device; receiving, from the media presentation device, identifying information of the first user device and identifying information of a third user device; in response to receiving the identifying information of the first user device, determining that the first user preferences are associated with the media presentation device; in response to receiving the identifying information of the third user device, determining that there are not user preferences associated with a user of the third user device associated with the media presentation device; and causing content to be presented by the media presentation device based on user preferences associated with the media presentation device including the first user preferences.

In accordance with some embodiments of the disclosed subject matter, a system for determining content to be presented is provided, the system comprising: a hardware processor that is programmed to: receive first user preferences associated with a first user; receive second user preferences associated with a second user; receive, from a first user device, a request to associate the first user preferences with a media presentation device; in response to the request to associate the first user preferences with the media presentation device, cause the first user preferences to be associated with identifying information of the media presentation device; receive, from a second user device, a request to associate the second user preferences with the media presentation device; in response to the request to associate the second user preferences with the media presentation device, cause the second user preferences to be associated with identifying information of the media presentation device; receive, from the media presentation device, a request to present a slideshow of images based on user preferences associated with the media presentation device; receive, from the media presentation device, identifying information of the first user device and identifying information of a third user device; in response to receiving the identifying information of the first user device, determine that the first user preferences are associated with the media presentation device; in response to receiving the identifying information of the third user device, determine that there are not user preferences associated with a user of the third user device associated with the media presentation device; and cause content to be presented by the media presentation device based on user preferences associated with the media presentation device including the first user preferences.

In accordance with some implementations of the disclosed subject matter, a non-transitory computer-readable medium containing computer executable instructions that, when executed by a processor, cause the processor to perform a method for determining content to be presented, the method comprising: receiving first user preferences associated with a first user; receiving second user preferences associated with a second user; receiving, from a first user device, a request to associate the first user preferences with a media presentation device; in response to the request to associate the first user preferences with the media presentation device, causing the first user preferences to be associated with identifying information of the media presentation device; receiving, from a second user device, a request to associate the second user preferences with the media presentation device; in response to the request to associate the second user preferences with the media presentation device, causing the second user preferences to be associated with identifying information of the media presentation device; receiving, from the media presentation device, a request to present a slideshow of images based on user preferences associated with the media presentation device; receiving, from the media presentation device, identifying information of the first user device and identifying information of a third user device; in response to receiving the identifying information of the first user device, determining that the first user preferences are associated with the media presentation device; in response to receiving the identifying information of the third user device, determining that there are not user preferences associated with a user of the third user device associated with the media presentation device; and causing content to be presented by the media presentation device based on user preferences associated with the media presentation device including the first user preferences.

In accordance with some implementations of the disclosed subject matter, a system for determining content to be presented is provided, the system comprising: means for receiving first user preferences associated with a first user; means for receiving second user preferences associated with a second user; means for receiving, from a first user device, a request to associate the first user preferences with a media presentation device; means for causing the first user preferences to be associated with identifying information of the media presentation device in response to the request to associate the first user preferences with the media presentation device; means for receiving, from a second user device, a request to associate the second user preferences with the media presentation device; means for causing the second user preferences to be associated with identifying information of the media presentation device in response to the request to associate the second user preferences with the media presentation device; means for receiving, from the media presentation device, a request to present a slideshow of images based on user preferences associated with the media presentation device; means for receiving, from the media presentation device, identifying information of the first user device and identifying information of a third user device; means for determining that the first user preferences are associated with the media presentation device in response to receiving the identifying information of the first user device; means for determining that there are not user preferences associated with a user of the third user device associated with the media presentation device in response to receiving the identifying information of the third user device; and means for causing content to be presented by the media presentation device based on user preferences associated with the media presentation device including the first user preferences.

In some implementations, the system further comprises: means for receiving, from the media presentation device, identifying information of the second user device; and means for determining that the second user preferences are associated with the media presentation device in response to receiving the identifying information of the second device.

In some implementations, the system further comprises: means for generating a group identifier; means for associating the group identifier with the first device and the second device; means for generating combined user preferences based on the first user preferences and the second user preferences; means for associating the combined user preferences with the group identifier; and wherein the means for causing the content to be presented by the media presentation device further comprises means for causing the content to be presented by the media presentation device based on the combined user preferences.

In some implementations, the system further comprises: means for receiving an indication that the second user device is no longer in proximity to the presentation device; and means for inhibiting use of the combined user preferences in determining which content is to be presented in response to receiving the indication.

In some implementations, the system further comprises: means for receiving, from the second user device, a request to disassociate the second user preferences from the media presentation device; means for receiving, from the media presentation device, identifying information of the second user device; and means for determining that there are not user preferences associated with the second user device associated with the media presentation device in response to receiving the identifying information of the second user device.

In some implementations, the system further comprises: means for receiving, from the first user device, a request to associate the first user preferences with a second media presentation device; means for causing the first user preferences to be associated with identifying information of the second media presentation device in response to the request to associate the first user preferences with the second media presentation device; means for receiving, from the second media presentation device, a request to present a slideshow of images based on user preferences associated with the second media presentation device; means for receiving, from the second media presentation device, identifying information of the first user device; means for determining that the first user preferences are associated with the second media presentation device in response to receiving the identifying information of the first device; and means for causing content to be presented by the media presentation device based on user preferences associated with the media presentation device including the first user preferences.

In some implementations, the first user preferences indicate one or more topics of interest.

In accordance with some implementations of the disclosed subject matter, methods, systems, and media for presenting media content based on user preferences are provided.

In accordance with some implementations of the disclosed subject matter, a method for presenting media content based on user preferences is provided, the method comprising: detecting, using a hardware processor, a presence of a first user device associated with a first user and a second user device associated with a second user, wherein the first user device and the second user device are detected by a media presentation device; receiving, from the first user device, a request to associate first user preferences of the first user with the media presentation device; receiving, from the second user device, a request to associate second user preferences of the second user with the media presentation device; causing at least a portion of the first user preferences and the second user preferences to be associated with the media presentation device; causing a slideshow of customized content based on the portion of the first user preferences and the second user preferences associated with the media presentation device to be presented, wherein the presentation of each piece of customized content causes a plurality of supplemental information to be retrieved; and, based on the customized content currently being presented on the media presentation device, causing first supplemental information from the plurality of supplemental information to be presented on the first user device based on the first user preferences and second supplemental information from the plurality of supplemental information to be presented on the second user device based on the second user preferences.

In accordance with some implementations of the disclosed subject matter, a system for presenting media content based on user preferences is provided, the system comprising: a hardware processor that is programmed to detect a presence of a first user device associated with a first user and a second user device associated with a second user, wherein the first user device and the second user device are detected by a media presentation device; receive, from the first user device, a request to associate first user preferences of the first user with the media presentation device; receive, from the second user device, a request to associate second user preferences of the second user with the media presentation device; cause at least a portion of the first user preferences and the second user preferences to be associated with the media presentation device; cause a slideshow of customized content based on the portion of the first user preferences and the second user preferences associated with the media presentation device to be presented, wherein the presentation of each piece of customized content causes a plurality of supplemental information to be retrieved; and based on the customized content currently being presented on the media presentation device, cause first supplemental information from the plurality of supplemental information to be presented on the first user device based on the first user preferences and second supplemental information from the plurality of supplemental information to be presented on the second user device based on the second user preferences.

In accordance with some implementations of the disclosed subject matter, a non-transitory computer-readable medium containing computer executable instructions that, when executed by a processor, cause the processor to perform a method for presenting media content based on user preferences is provided, the method comprising: detecting a presence of a first user device associated with a first user and a second user device associated with a second user, wherein the first user device and the second user device are detected by a media presentation device; receiving, from the first user device, a request to associate first user preferences of the first user with the media presentation device; receiving, from the second user device, a request to associate second user preferences of the second user with the media presentation device; causing at least a portion of the first user preferences and the second user preferences to be associated with the media presentation device; causing a slideshow of customized content based on the portion of the first user preferences and the second user preferences associated with the media presentation device to be presented, wherein the presentation of each piece of customized content causes a plurality of supplemental information to be retrieved; and, based on the customized content currently being presented on the media presentation device, causing first supplemental information from the plurality of supplemental information to be presented on the first user device based on the first user preferences and second supplemental information from the plurality of supplemental information to be presented on the second user device based on the second user preferences.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
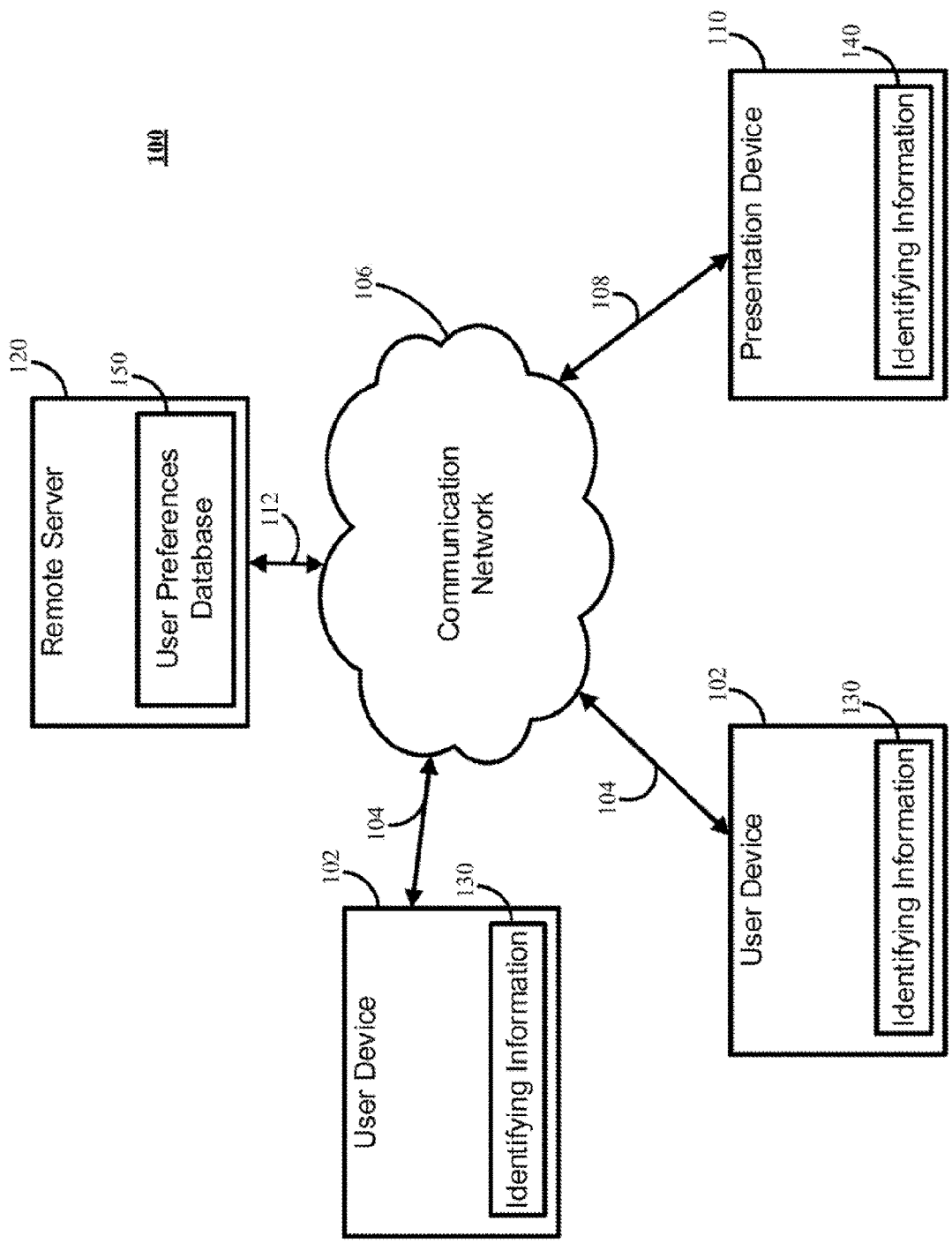
FIG. 1 shows an example of a generalized schematic diagram of a system on which the mechanisms for associating multiple users with a presentation device as described herein can be implemented in accordance with some implementations.

In accordance with some implementations of the disclosed subject matter, mechanisms (which can include methods, systems and media) for associating multiple users with a media presentation device are provided.

In some implementations, these mechanisms can allow user preferences for multiple users to be associated with a single media presentation device without the media presentation device storing personal data, such as credentials and/or user preferences, of users and/or user devices associated with the user preferences. In some implementations, a user device such as a smartphone can be associated with the media presentation device in order to cause the media presentation device to present content. For example, the smartphone can be associated with the media presentation device to cause media content discovered using the smartphone to be presented on a larger screen coupled to the media presentation application. In some implementations, a media presentation device can cause content that is to be presented to be automatically selected based on user preferences of users associated with the media presentation device. For example, during periods of time when the media presentation device is not being used to present content in response to a request from a user device, the media presentation application can present a slideshow of images. The images in the slideshow can be selected based on the user preferences of one or more users associated with the media presentation device. As another example, an application for presenting content can recommend content to be presented based on user preferences associated with the media presentation device. The user preferences of multiple users present at the media presentation device (e.g., based on user devices associated with the users being present on a local network) can be used such that content selected for presentation can be based on the user preferences of the multiple users if the users' preferences are associated with the presentation device.

In some implementations, the user preferences from one or more users can be used to customize the content being presented by the media presentation device. In some implementations, a user preference for presenting customized content can include any suitable information related to content that may interest one or more users. For example, the user preference can indicate a topic in which one or more users are interested, such as "weather," "news," "stocks," "photos," "arts," etc. As another example, the user preference can indicate a media source that can provide media content for presentation. In some implementations, such a media source can include a suitable service (e.g., a social networking service, a video sharing service, a photo sharing service, a file hosting service, etc.), a storage device (e.g., a local storage device, a cloud storage device, a user device, etc.), an account associated with one or more users (e.g., a user account with a social networking service and/or any other suitable service), and/or any other suitable source that can provide media content for presentation.

In some implementations, the customized content can be presented as part of a user interface of the media presentation device, such as a home screen or an initial launch screen of a media playback application executing on the media presentation device and/or any other suitable display screen presented by the media presentation device.

In some implementations, the mechanisms can cause customized content to be presented by the media presentation device based on the user preferences. For example, the mechanisms can identify one or more topics of interest to one or more users based on the user preferences. The mechanisms can then cause media content associated with the identified topic(s) to be presented using the media presentation device. In a more particular example, a collection of popular images related to the identified topic(s) can be presented by the media presentation device as a slideshow of images and/or in any other suitable manner. As another example, the mechanisms can identify one or more media sources designated by the user preferences. The mechanisms can then cause media content from the identified media source(s) to be presented by the media presentation device.

FIG. 1 shows an example 100 of a generalized schematic diagram of a system on which the mechanisms for associating multiple users with a presentation device as described herein can be implemented in accordance with some implementations. As illustrated, system 100 can include one or more user devices 102. User devices 102 can be local to each other or remote from each other. User devices 102 can be connected by one or more communications links 104 to a communication network 106 that can be linked to a server 120 via a communications link 112.

System 100 can include one or more presentation devices 110. Presentation devices 110 can be local to each other or remote from each other. Presentation devices 110 can be connected by one or more communications links 108 to communication network 106 that can be linked to server 120 via communications link 112 and/or user devices 102 via communications link 104.

System 100 can include one or more servers 120. Server 120 can be any suitable server or servers for providing access to the mechanisms described herein for associating multiple users with a presentation device, such as a processor, a computer, a data processing device, or any suitable combination of such devices. For example, the mechanisms for associating multiple users with a presentation device can be distributed into multiple backend components and multiple frontend components and/or user interfaces. In a more particular example, backend components, such as mechanisms for receiving requests to associate user preferences with a presentation device, requests identifying user preferences associated with a particular presentation device, requests to present content based on the user preferences, etc., can be performed on one or more servers 120. In another particular example, frontend components, such as mechanisms for presenting content, requesting content to be presented, identifying user devices that are present, setting user preferences, causing a user device to be associated with a presentation device, etc., can be performed on one or more user devices 102 and/or presentation device 110.

In some implementations, each of user devices 102, presentation device 110 and server 120 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, user device 102 can be implemented as a smartphone, a tablet computer, a wearable computer, a laptop computer, a portable game console, any other suitable computing device, or any suitable combination thereof. As another example, presentation device 110 can be implemented as a digital media receiver, a media streaming device, a game console, a set-top box, a television, a projector, any other suitable computing device, or any suitable combination thereof.

Communications network 106 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, one or more peer-to-peer connections, etc. Each of communications links 104, 108, and 112 can be any communications links suitable for communicating data among user devices 102, presentation device 110 and server 120, such as network links, dial-up links, wireless links, hard-wired links, any other suitable communications links, or any suitable combination of such links. Note that, in some implementations, multiple servers 120 can be used to provide access to different mechanisms associated with the mechanisms described herein for associating multiple users with a media presentation device. For example, system 100 can include a user preferences server 120 that stores user preferences associated with one or more users and/or one or more user devices 102, a user preferences database server 120 that maintains one or more databases of correspondence between users and/or user devices 102 with which a particular presentation device 110 is associated, a content delivery server 120 that determines which content to cause to be presented by the particular presentation device 110 based on the user preferences of users and/or user devices 102 associated with presentation device 110, and/or any other suitable servers for performing any suitable functions of the mechanisms described herein.

In some implementations, user device 102 can be associated with user identifying information 130. User identifying information 130 can identify a user of user device 102 and/or can identify user device 102. For example, in some implementations, user identifying information 130 can be a token or other data associated with a user of user device 102. For example, the token or other data can identify a user associated with a particular user account of a product and/or service. In a more particular example, such a token or other information can include a string of characters that is associated with a particular email address that was used to sign in to an application on the user device. As another example, user identifying information 130 can be identifying information of user device 102, such as a MAC address, a device ID, a serial number, and/or any other suitable identifying information of user device 102. As yet another example, user identifying information 130 can be a combination of identifying information of a user and identifying information of user device 102.

In some implementations, presentation device 110 can be associated with presentation device identifying information 140. Presentation device identifying information 140 can identify a user of presentation device 110 and/or presentation device 110. For example, in some implementations, device identifying information 140 can be a token or other data associated with a user of presentation device 110. For example, the token or other data can identify a user associated with a particular user account of a product and/or service. In a more particular example, such a token or other information can include a string of characters (which can be, for example, randomly assigned) that is associated with a particular email address that was used as a credential to log in to an application on the presentation device. As another example, presentation device identifying information 140 can be identifying information of presentation device 110, such as a MAC address, a device ID, a serial number, and/or any other suitable identifying information of presentation device 110. As yet another example, presentation device identifying information 140 can be a combination of identifying information of a user and identifying information of presentation device 110. In some implementations, presentation device identifying information 140 can include semantically meaningful identifying information, such as a user assigned name (e.g., "Brett's Living Room Streaming Device").

In some implementations, presentation device identifying information 140 can include a persistent identifier for presentation device 110 that can be assigned based on any suitable conditions. For example, a device ID of presentation device 110 can be assigned when presentation device 110 is initialized and/or reinitialized. In a more particular example, during initialization presentation device 110 can contact a server to request a persistent device ID. In some implementations, this device ID can be assigned by the server such that each presentation device has a unique device ID. Additionally, presentation device 110 can receive a different device ID upon presentation device 110 being reset or otherwise reinitialized. In some implementations, such a device ID can be used to associate user preferences and/or any other suitable information (e.g., at a server) with presentation device 110 for later use in determining content to be presented using presentation device 110.

In some implementations, server 120 can store a user preferences database 150. User preferences database 150 can include user preferences associated with a user of a particular user device 102 (e.g., associated with user identifying information 130 of that user device 102). Additionally or alternatively, in some implementations, user preferences database 150 can include information identifying which users are associated with which presentation devices (e.g., by relating user identifying information 130 and presentation device identifying information 140). In some implementations, information in user preferences database 150 can be organized using any suitable technique or combination of techniques. For example, user preferences database 150 can be organized as a relational database.

In some implementations, information stored in user preferences database can be stored such that personal information of a user is obscured. For example, user identifying information 130 and/or presentation device identifying information 140 can be an assigned identification number and/or code name and user preferences can be associated with such an identification number and/or code name.

Figure 2:
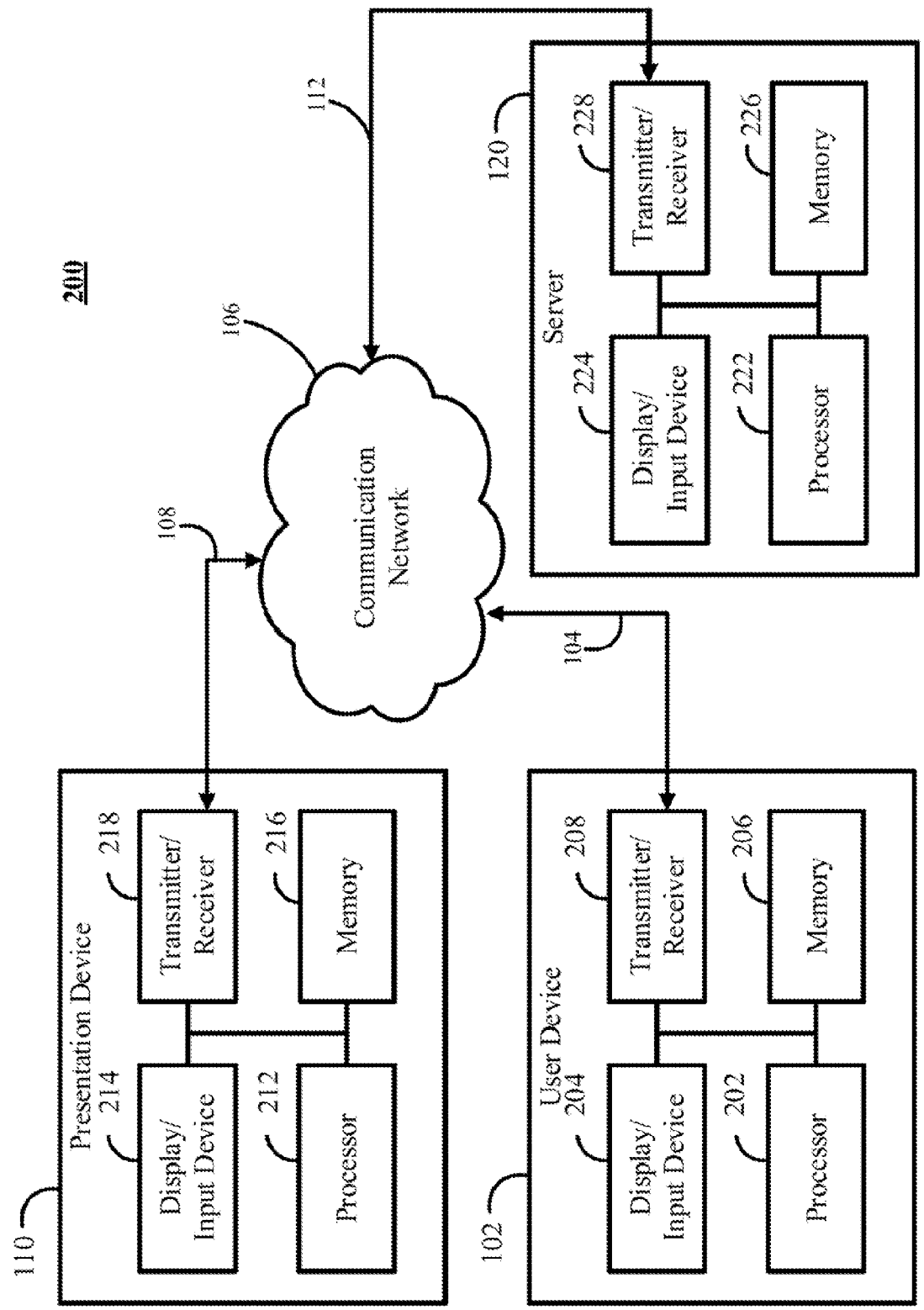
FIG. 2 shows an example of hardware that can be used to implement one or more user devices, presentation devices and servers depicted in FIG. 1 in accordance with some implementations of the disclosed subject matter.

FIG. 2 shows an example 200 of hardware that can be used to implement one or more of user devices 102, presentation devices 110 and servers 120 depicted in FIG. 1 in accordance with some implementations of the disclosed subject matter. Referring to FIG. 2, user device 102 can include a hardware processor 202, a display/input device 204, memory 206 and a transmitter/receiver 208, which can be interconnected. In some implementations, memory 206 can include a storage device (such as a computer-readable medium) for storing a user device program for controlling hardware processor 202.

Hardware processor 202 can use the user device program to execute and/or interact with the mechanisms described herein for associating multiple devices with a media presentation device, controlling presentation of the content on the media presentation device, disassociating user preferences from the media presentation device, setting user preferences, etc. In some implementations, the user device program can cause hardware processor 202 to, for example, interact with a device executing at least a portion of process 300 as described below in connection with FIG. 3. In some implementations, hardware processor 202 can send and receive data through communications link 104 or any other communication links using, for example, a transmitter, a receiver, a transmitter/receiver, a transceiver, or any other suitable communication device, such as transmitter/receiver 208. Display/input device 204 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. Transmitter/receiver 208 can include any suitable transmitter and/or receiver for transmitting and/or receiving, among other things, instructions for presenting content, instructions for setting user preferences, instructions for associating user preferences with a presentation device, etc., and can include any suitable hardware, firmware and/or software for interfacing with one or more communication networks, such as network 106 shown in FIG. 1. For example, transmitter/receiver 208 can include network interface card circuitry, wireless communication circuitry, and/or any other suitable type of communication network circuitry, one or more antennas, and/or any other suitable hardware, firmware and/or software for transmitting and/or receiving signals.

Presentation device 110 can include a hardware processor 212, a display/input device 214, memory 216 and a transmitter/receiver 218, which can be interconnected. In some implementations, memory 216 can include a storage device (such as a computer-readable medium) for storing a presentation device program for controlling hardware processor 212.

Hardware processor 212 can use the presentation device program to execute and/or interact with the mechanisms described herein for associating multiple users with a media presentation device, requesting content to present based on user preferences of associated users, request and/or transmit presentation device identifying information 140, etc. In some implementations, the presentation device program can cause hardware processor 212 to, for example, interact with a device executing at least a portion of processes 300, 500, 600 and 700 as described below in connection with FIGS. 3 and 5-7, respectively. In some implementations, hardware processor 212 can send and receive data through communications link 108 or any other communication links using, for example, a transmitter, a receiver, a transmitter/receiver, a transceiver, or any other suitable communication device, such as transmitter/receiver 218. Display/input device 214 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. In some embodiments, display/input device 214 of presentation device 110 can be omitted. Transmitter/receiver 218 can include any suitable transmitter and/or receiver for transmitting and/or receiving, among other things, requests for content to be presented, content to be presented, signals to determine whether one or more user devices 102 are present, etc., and can include any suitable hardware, firmware and/or software for interfacing with one or more communication networks, such as network 106 shown in FIG. 2. For example, transmitter/receiver 218 can include network interface card circuitry, wireless communication circuitry, USB input and/or output circuitry, HDMI input and/or output circuitry, and/or any other suitable type of communication network circuitry, one or more antennas, and/or any other suitable hardware, firmware and/or software for transmitting and/or receiving signals.

Server 120 can include a hardware processor 222, a display/input device 224, memory 226 and a transmitter/receiver 228, which can be interconnected. In some implementations, memory 228 can include a storage device for storing data received through communications link 112 or through other links. The storage device can further include a server program for controlling hardware processor 222. In some implementations, memory 228 can include information stored as a result of user activity and/or activity by a presentation device (e.g., user preferences, user identifying information 130, presentation device identifying information 140, user preferences database 150, content to be presented, requests for content to be presented, user credentials for use in accessing content to be presented, etc.). In some implementations, the server program can cause hardware process 222 to, for example, execute at least a portion of process 300, 500, 600 and 700 as described below in connection with FIGS. 3 and 5-7, respectively.

Hardware processor 222 can use the server program to communicate with user devices 102 and/or presentation device 110 as well as provide access to and/or copies of the mechanisms described herein. It should also be noted that data received through communications link 112 or any other communications links can be received from any suitable source. In some implementations, hardware processor 222 can send and receive data through communications link 112 or any other communications links using, for example, a transmitter, a receiver, a transmitter/receiver, a transceiver, or any other suitable communication device, such as transmitter/receiver 228. In some implementations, hardware processor 222 can receive commands and/or values transmitted by one or more user devices 102, presentation device 110, one or more other servers 120, and/or one or more users of server 120, such as a user that makes changes to adjust settings associated with the mechanisms described herein for associating multiple users with a media presentation device. Display 224 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. Transmitter/receiver 228 can include any suitable transmitter and/or receiver for transmitting and/or receiving, among other things, content to be presented, user preferences, user identifying information 130, presentation device identifying information 140, requests for content, etc., and can include any suitable hardware, firmware and/or software for interfacing with one or more communication networks, such as network 106 shown in FIG. 2. For example, transmitter/receiver 228 can include network interface card circuitry, wireless communication circuitry, and/or any other suitable type of communication network circuitry, one or more antennas, and/or any other suitable hardware, firmware and/or software for transmitting and/or receiving signals.

In some implementations, server 120 can be implemented in one server or can be distributed as any suitable number of servers. For example, multiple servers 120 can be implemented in various locations to increase reliability and/or increase the speed at which the server can communicate with user devices 102 and/or presentation device 110. Additionally or alternatively, as described above in connection with FIG. 1, multiple servers 120 can be implemented to perform different tasks associated with the mechanisms described herein.

Figure 3:
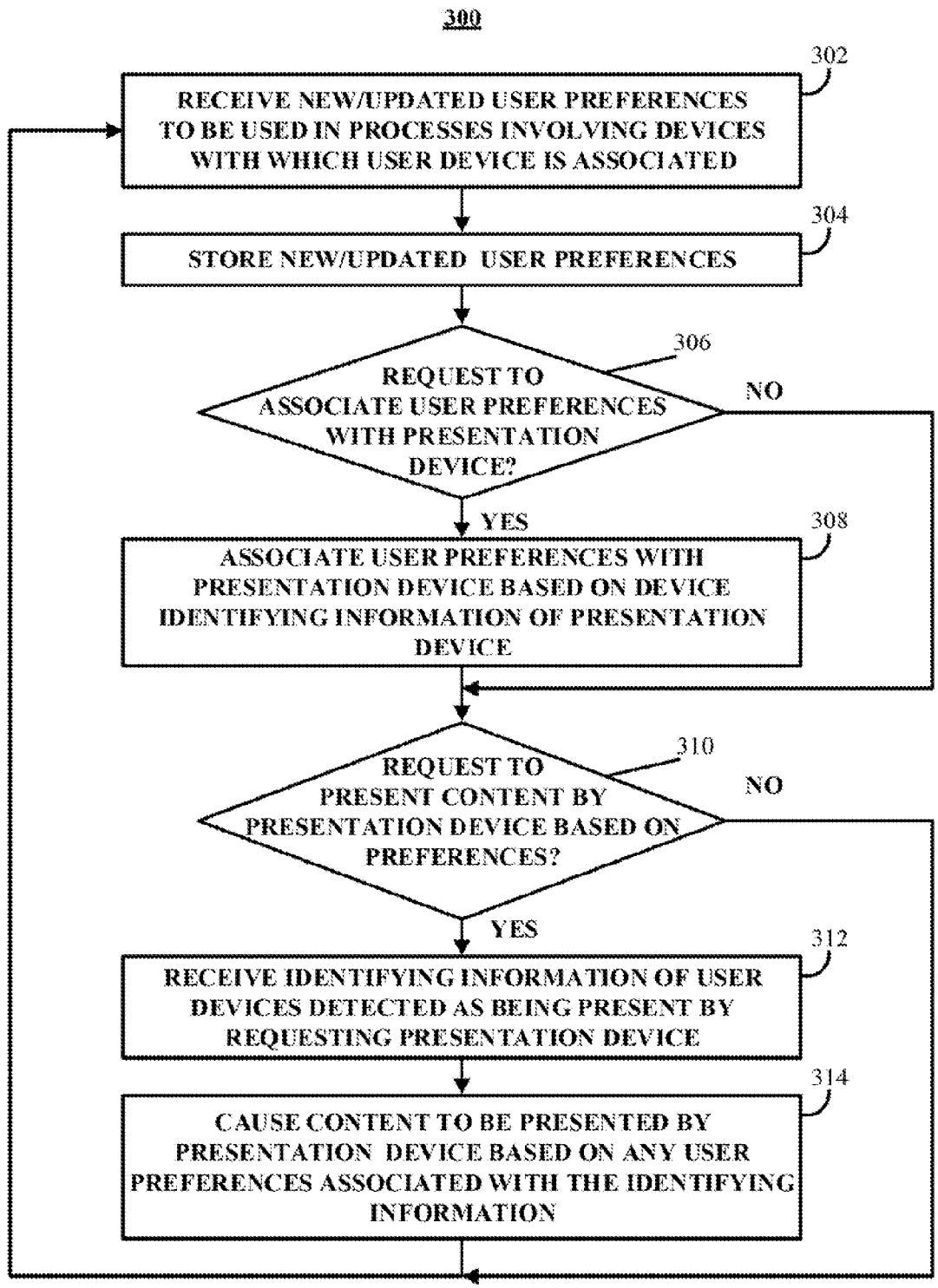
FIG. 3 shows an example of a process for associating multiple users with a media presentation device in accordance with some implementations of the disclosed subject matter.

FIG. 3 shows an example 300 of a process for associating multiple users with a media presentation device in accordance with some implementations of the disclosed subject matter. As shown in FIG. 3, process 300 can begin, at 302, by receiving new and/or updated user preferences to be used in processes involving devices with which the user preferences have been associated. In some implementations, such user preferences can, for example, include a user's stated interests, a user's implied interests, media content that the user has consumed, media content and/or products about which the user has commented on and/or that the user has rated, and/or any other suitable information about the user. In some implementations, a user's implied interests can be based on user actions such as what types of media content the user consumes, what types of products the user buys, the user's actions with relation to the content and/or products (e.g., whether the user is engaged with the content/product by commenting and/or "liking" the content/product, a rating given to the content/product, etc.). In some implementations, a user is given an opportunity to determine which information is used in determining user preferences. For example, in some implementations, user preferences can be manually entered by a user. As another example, in some implementations, a user can select one or more sources of information that may or may not be used in determining user preferences. In some implementations, user preferences can be updated in response to a user instruction to update user preferences (e.g., in response to a user editing user preferences, making changes to permissions of which sources of information can be used for determining user preferences, etc.). Additionally or alternatively, user preferences can be updated automatically based on any suitable criteria or criterion, such as in response to an event (e.g., in response to the user taking an action with relation to content and/or a product), in response to a particular period of time having elapsed, etc.

At 304, process 300 can cause the new and/or updated user preferences to be stored in connection with the user to which the user preferences pertain. Any suitable technique or combination of techniques can be used to determine to which user the user preferences received at 302 pertain. For example, user identifying information (e.g., user identifying information 130) associated with information used to set the new and/or updated user preferences received at 302 can be used to associate the user preferences with a particular user. As another example, identifying information of an account that caused the new and/or updated user settings to be submitted to a device executing process 300 can be used to associate the user preferences with a particular user. In some implementations, actions performed on multiple devices can be associated with the same user, based on identifying information of the user device used to perform an action and/or identifying information of an account to which the device was logged in when the action was performed. For example, multiple user devices can be associated with a user by registering the user device to the user. In a more particular example, actions performed on such a user device can be attributed to the user by using identifying information associated with each user device (e.g., user identifying information 130). As another example, in cases when an application used to perform an action is associated with a user account (e.g., by logging in to the user account though the application), an action can be associated with the user regardless of whether the device used to perform the action is otherwise associated with the user (or another user).

At 306, process 300 can determine whether a request to associate particular user preferences with a particular presentation device has been received. In some implementations, such a request can be associated with a particular user based on user identifying information (e.g., user identifying information 130) associated with the request. Additionally, in some implementations, such a request can be associated with a particular presentation device based on presentation device identifying information (e.g., presentation device identifying information 140) associated with the request. In some implementations, such a request can be initiated by any suitable device (e.g., user device 102, presentation device 110, etc.) and in response to any suitable action performed on such a device. For example, user device 102 can cause a request to associate a user of user device 102 (e.g., based on user identifying information 130) with a particular presentation device 110 to be sent to server 120 executing at least a portion of process 300 in response to and/or as part of a request initiated by a user to present particular content on presentation device 110. As another example, presentation device 110 can cause a request to associate a user of user device 102 with presentation device 110 to be sent to server 120 executing at least a portion of process 300 in response to presentation device 110 receiving an instruction from such a user device 102 to perform any suitable action. As yet another example, user device 102 can cause a request to associate a user of user device 102 (e.g., based on user identifying information 130) with a particular presentation device 110 to be sent to server 120 executing at least a portion of process 300 in response to any suitable user action initiating such an association.

If process 300 determines that such a request has been received ("YES" at 306), process 300 can proceed to 308. At 308, process 300 can cause user preferences associated with the user (e.g., a user identified by user identifying information received with the request) that caused the request received at 306 to be sent, to be associated with the presentation device (a presentation device identified by presentation device identifying information received with the request). Such an association can, for example, be stored in a database or list (e.g., user preferences database 150) such that the association can be determined at a later time.

If process 300 determines that a request to associate user preferences with a presentation device has not been received ("NO" at 306), process 300 can proceed to 310. At 310, process 300 can determine whether a request to present content based on user preferences associated with a presentation device has been received. In some implementations, such a request can be a request for content to be presented by the presentation device, where the content that is to be presented is determined, at least in part, by a server. In such implementations, the server (which may or may not be a server executing process 300) can use user preferences to determine which content is to be presented. In some implementations, a determination as to which user preferences to use in determining the content to be presented can be based, at least in part, on which users are associated with the presentation device that is requesting the content.

If process 300 determines that such a request has been received ("YES" at 310), process 300 can proceed to 312. At 312, process 300 can receive identifying information of user devices detected as being present by the requesting presentation device (e.g., a device associated with the request received at 310). In some implementations, any suitable technique or combination of techniques can be used to detect the presence of a particular user device. For example, presentation device 110 can detect user devices that are connected to a same local network as presentation device 110 (e.g., a LAN including a Wi-Fi network). As another example, presentation device 110 can broadcast and/or unicast one or more messages targeting nearby user devices 102 using any suitable communication techniques, such as peer-to-peer communication techniques. In a more particular example, presentation device 110 can use transmitter/receiver 218 to transmit one or more signals (e.g., using any suitable communication standard such as Bluetooth, wireless USB, etc.) to any nearby user devices 102 which can, in some cases, receive the signal using transmitter/receiver 208 and respond with a message indicating that the user device is present. In another more particular example, presentation device 110 can use a speaker to emit a signal as sound waves, which can be outside the range of human hearing, to any nearby user devices 102 which can, in some cases, receive the signal using a microphone and respond with a message indicating that the user device is present.

In some implementations, in lieu of or in addition to a user device 102 responding to a signal from presentation device 110 to detect presence of user devices 102, user device 102 can transmit a signal to server 120 identifying itself as being in the presence of presentation device 110.

At 314, process 300 can cause content to be presented by the presentation device based on user preferences of users associated with user devices identified by information received at 312. In some implementations, process 300 can compare identifying information for each user received at 312 to user preferences stored in association with the presentation device that requested the content. In such implementations, for users not associated with the presentation device, process 300 can inhibit any user preferences of the non-associated users from being used in determining which content to present. For example, presentation device 110 and/or user devices 102 can send identifying information (e.g., a MAC address, a device ID, etc.) of all user devices that receive the signal from presentation device 110 and/or respond to such a signal, and server 120 executing process 300 can determine which of those devices are associated with a user that has user preferences associated with presentation device 110.

In some implementations, process 300 can cause user preferences of users that are associated with the presentation device that sent the request for content to be retrieved for use in determining which content is to be presented by the requesting user device. Additionally, in some implementations, a device executing process 300 (e.g., a first server 120) or any other suitable device or combination of devices (e.g., one or more other servers 120) can use the retrieved user preferences in any suitable combination to determine content that is to be presented by a requesting presentation device.

In some implementations, identifying information of user devices received at 312 can be grouped by process 300 using a group ID and/or any other suitable information to identify a particular combination of devices that are present. In such implementations, the group ID can correspond to user devices that are detected and for which there are user preferences associated with presentation device 110. When a combination of user devices that is different from combinations of user devices represented by existing group IDs is in proximity to a presentation device, a new group ID can be associated with the new combination. User preferences corresponding to all user devices represented by a group ID can be combined and associated with the group ID. These user preferences can then be used when that combination of devices is present. For example, when a first group of user devices is present a user preferences associated with first group ID can be used to determine content that is to be presented by a presentation device. In such an example, when another user device that has user preferences associated with the presentation device becomes present (e.g., a new user associates preferences with the user device, a user device with user preferences already associated comes into proximity of the device, etc.) of when a device that is present is no longer present (e.g., a user disassociates their user device from the presentation device, a user device leaves a proximity of the presentation device, etc.), user preferences associated with a different group ID can be used in determine which content is to be presented. In some implementations, user preferences associated with a group ID can be updated in response to any suitable action (e.g., user preferences of a particular user being updated, a user disassociating from the presentation device, after a predetermined period of time has elapsed, etc.).

In some implementations, in response to the user preferences being used to identify which content to present, a device executing process 300 and/or any other suitable processes, can cause the requesting presentation device to present the identified content.

Figure 4:
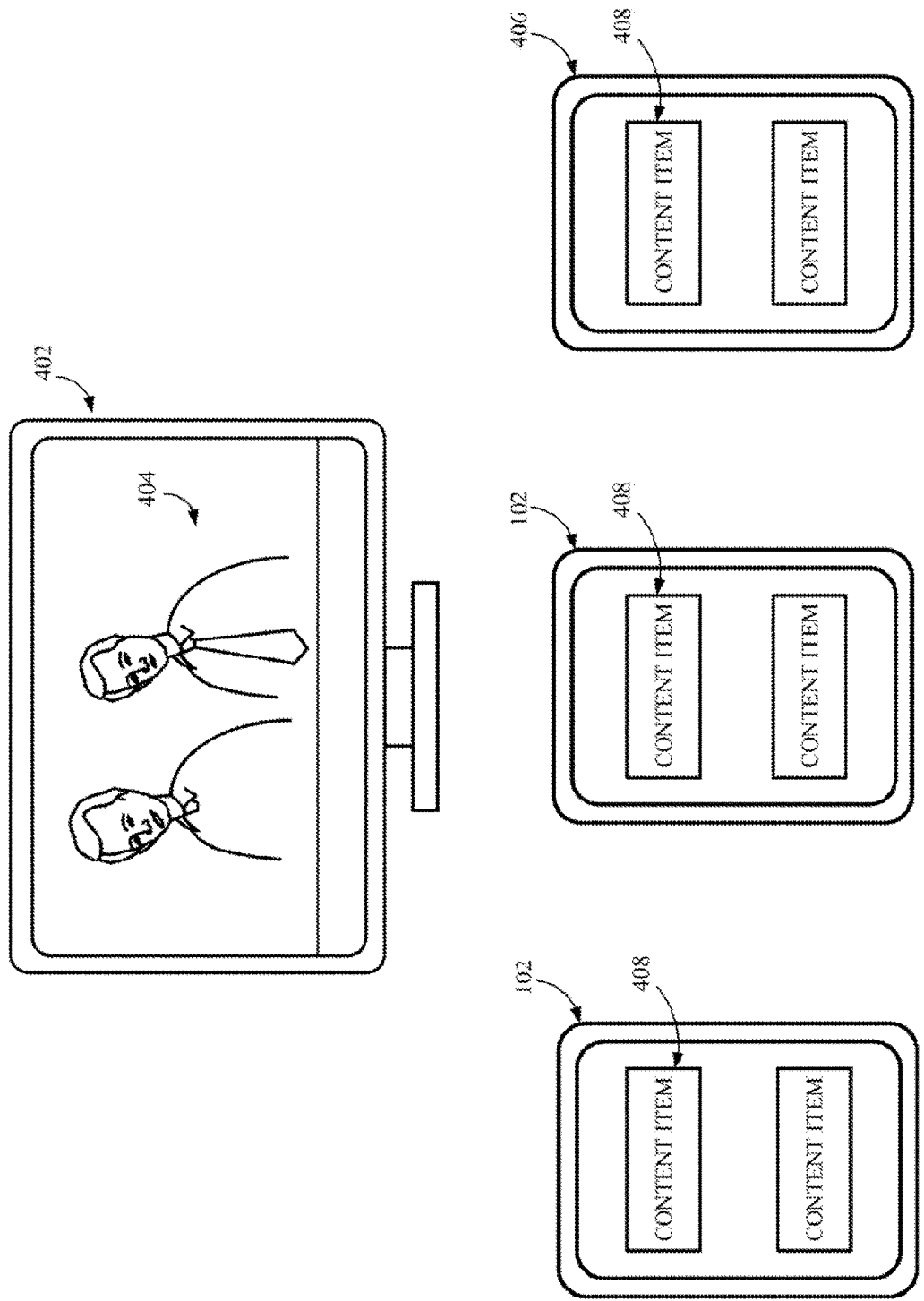
FIG. 4 shows an example of a display device presenting content in accordance with some implementations of the disclosed subject matter.

FIG. 4 shows an example of a display device 402 presenting content 404 in accordance with some implementations of the disclosed subject matter. In some implementations, display device 402 can be operatively coupled to a presentation device (e.g., presentation device 110) and/or a presentation device can be incorporated into display device 402. In some implementations, content 404 can be default content associated with presentation device 110, such as a collection of images from one source or multiple sources (e.g., a locally stored database of images, images stored on the presentation device, a server, etc.). In some implementations, the collection of images can be displayed as a slideshow of images. For example, each of the images in the slideshow can be presented one (or many) at a time for a predetermined period of time (e.g., fifteen seconds, thirty seconds, etc.).

In some implementations, upon detecting the presence of one or more user devices 102 that are associated with presentation device 110, the mechanisms can retrieve one or more user preferences associated with user device(s) 102 (e.g., as described above in connection with process 300 of FIG. 3) and can cause customized content to be presented on display device 402 based on the retrieved user preferences. For example, the mechanisms can identify a media source (e.g., a service, a local storage device, etc.) designated by the retrieved user preferences and can cause media content provided by the media source to be presented on display device 402. As another example, the mechanisms can identify one or more topics in which one or more users associated with user device(s) 102 might interested based on the user preferences and can cause media content related to the identified topic(s) to be presented by display device 402. In a more particular example, the mechanisms can cause media content about weather or traffic information to be presented in response to determining that the user(s) may be interested in such information based on the user preferences. In another more particular example, the mechanisms can cause images from one or more users associated with user device(s) 102 (e.g., photos published by a user associate with user device(s) 102 via a social networking service) to be presented in response to determining that the user(s) might be interested in personal photos based on the retrieved user preferences.

In some implementations, the mechanisms can cause supplemental information related to content 404 to be presented on one or more user devices that are in a proximity of display device 404, such as user device(s) 102 associated with presentation device 110, a user device 406 that is not associated with presentation device 110, and/or any other suitable user device. For example, when presenting an image of a painting on display device 402, the mechanisms can cause information related to the painting (e.g., information about the artist of the painting, reviews related to the painting, a link to information about the painting, etc.) to be presented by user devices 102 and/or 406. As another example, when presenting a representation of a news article (e.g., a snippet of the news article, a picture of the news article, etc.) on display device 402, the mechanisms can cause a link to the news article, one or more links to other news documents (e.g., a similar article, a follow-up article, etc.), and/or any other suitable information related to the news article to be presented by user devices 102 and/or 406.

In some implementations, supplemental information related to content 404 can be presented by a user device (e.g., user devices 102 and/or 406) using any suitable content item, such as one or more content items 408 as shown in FIG. 4. In some implementations, content item(s) 408 can be presented using text, images, icons, graphics, videos, animations, audio clips, hypertext, hyperlinks, sounds, and/or any other suitable media content. In some implementations, one or more suitable portions of content item(s) 408 can be user selectable. For example, the mechanisms can cause the news article and/or content related to the news article to be presented on the user device (e.g., using a web browser application, etc.) in response to receiving a user selection of a content item 408 corresponding to a news article at the user device.

Figure 5:
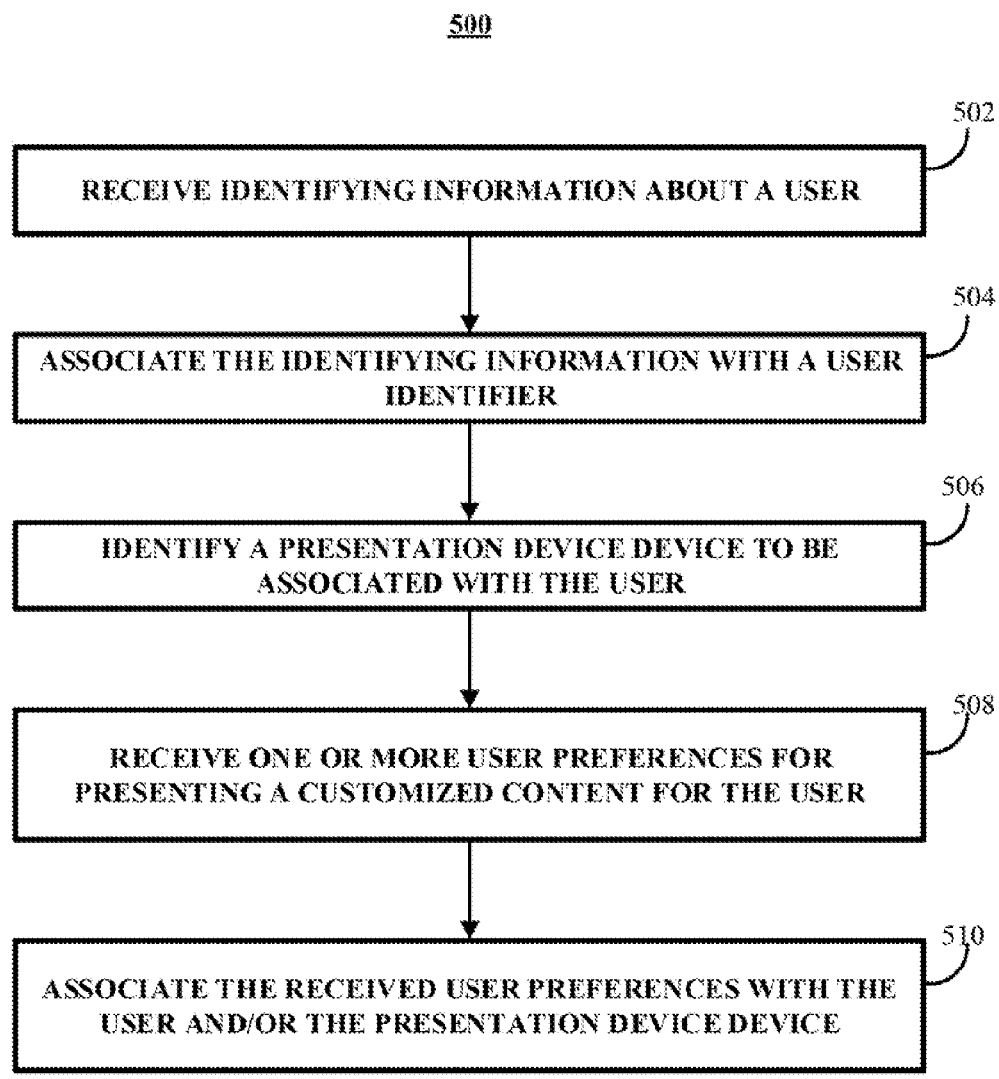
FIG. 5 shows an example of a process for associating user preferences with a presentation device in accordance with some implementations of the disclosed subject matter.

Turning to FIG. 5, an example 500 of a process for associating user preferences with a presentation device in accordance with some implementations of the disclosed subject matter is shown.

As illustrated, process 500 can begin by receiving identifying information about a user at 502. In some implementations, the identifying information can include any suitable information that can be used to identify a user and/or a user device associated with the user. For example, the identifying information can be user identifying information 130 as discussed above in connection with FIG. 1. In a more particular example, the identifying information can be and/or include an email address, a username, a pass code, an image, a uniform resource identifier (URI), a fingerprint, and/or any other suitable information that can be used to identify the user and/or an account associated with the user (e.g., a user account with a social networking service, a video sharing service, a file hosting service, a photo sharing service, a messaging service, etc.). As another more particular example, the identifying information can include a device identifier, a media address control (MAC) address, a serial number, a product identifier, and/or any other suitable information that can be used to identify a user device associated with the user.

At 504, process 500 can associate the identifying information with a user identifier. In some implementations, a user identifier can be a string, a number, or any suitable combination of numbers, letters, characters, symbols, etc. that can be used to uniquely identify a user and/or a user device associated with the user. In some implementations, the user identifier can have any suitable length and value.

In some implementations, process 500 can identify an existing user identifier that has been associated with the user and can then associate the identifying information with the existing user identifier. Additionally or alternatively, process 500 can generate a user identifier upon receiving the identifying information using a hash function, a random number generator, a pseudorandom number generator, and/or any other suitable mechanism that can be used to generate a user identifier.

At 506, process 500 can identify a presentation device to be associated with the user. In some implementations, the presentation device can be identified using any suitable identifying information related to the presentation device (e.g., as described above in connection with 308 of FIG. 3), such as a device identifier, a media address control (MAC) address, a serial number, a product identifier, an IP address, and/or any other suitable information that can be used to identify the presentation device.

In some implementations, the identifying information can be obtained in any suitable manner. For example, process 500 can discover a presentation device using any suitable device discovery protocol. In a more particular example, a presentation device that is in a proximity of a user device associated with the user and/or that is connected to a given network (e.g., a Wi-Fi network) can be discovered as described below in connection with 702 of FIG. 7. Additionally or alternatively, process 500 can prompt the user to provide identifying information related to the presentation device.

At 508, process 500 can receive one or more user preferences for presenting customized content using the presentation device. In some implementations, a user preference for presenting customized content can include one or more topics that the user is interested in, such as "personal photos," "arts," "news," "lifestyle," "weather," "stocks," etc.

In some implementations, a user preference for presenting customized content can indicate one or more media sources that can provide content for presentation. In a more particular example, the media source(s) can be and/or include a service associated with and/or designated by the user, such as a social networking service, a video sharing service, a photo sharing service, a file sharing and/or storage service, a media streaming service, a messaging service, a website, etc. In another more particular example, the media source(s) can be and/or include a device associated with and/or designated by the user, such as a user device associated with the user, a storage device, etc. that can provide media content for presentation.

At 510, process 500 can associate the received user preferences with the user and/or the presentation device. For example, process 500 can store the user preferences in a database indexed by user and/or presentation device (e.g., as described above in connection with 308 of FIG. 3). In a more particular example, the user preferences can be stored in association with the user identifier, identifying information related to the presentation device, and/or any other suitable information, such that, in response to receiving a subsequent request for customized content and/or supplemental information related to customized content relating to a particular presentation device, a service can retrieve and/or determine customized content and/or supplemental information based on user preferences and/or any other suitable information associated with the presentation device.

Noted that in some implementations in which the mechanisms described herein collect information about a particular user, the user can be provided with an opportunity to control whether the mechanisms collect information about particular users and/or how collected user information is used by the mechanisms. Examples of information about a user can include the user's interests and identifying information of the user (e.g., a user profile, user credentials, device identification, etc.). Additionally, certain information about the user can be stored locally (e.g., not shared), encrypted, and/or treated in one or more ways before it is stored to remove personally identifiable information. For example, the mechanisms described herein can store user preferences and/or user interests for a particular user with an anonymous user identifier (e.g., a user identifier that is not associated with the user's name, the user's username and/or password, the user's email address, etc.). Using these techniques, the user can have control over what information is collected about the user and/or how that information is used by the mechanisms described herein.

Figure 6:
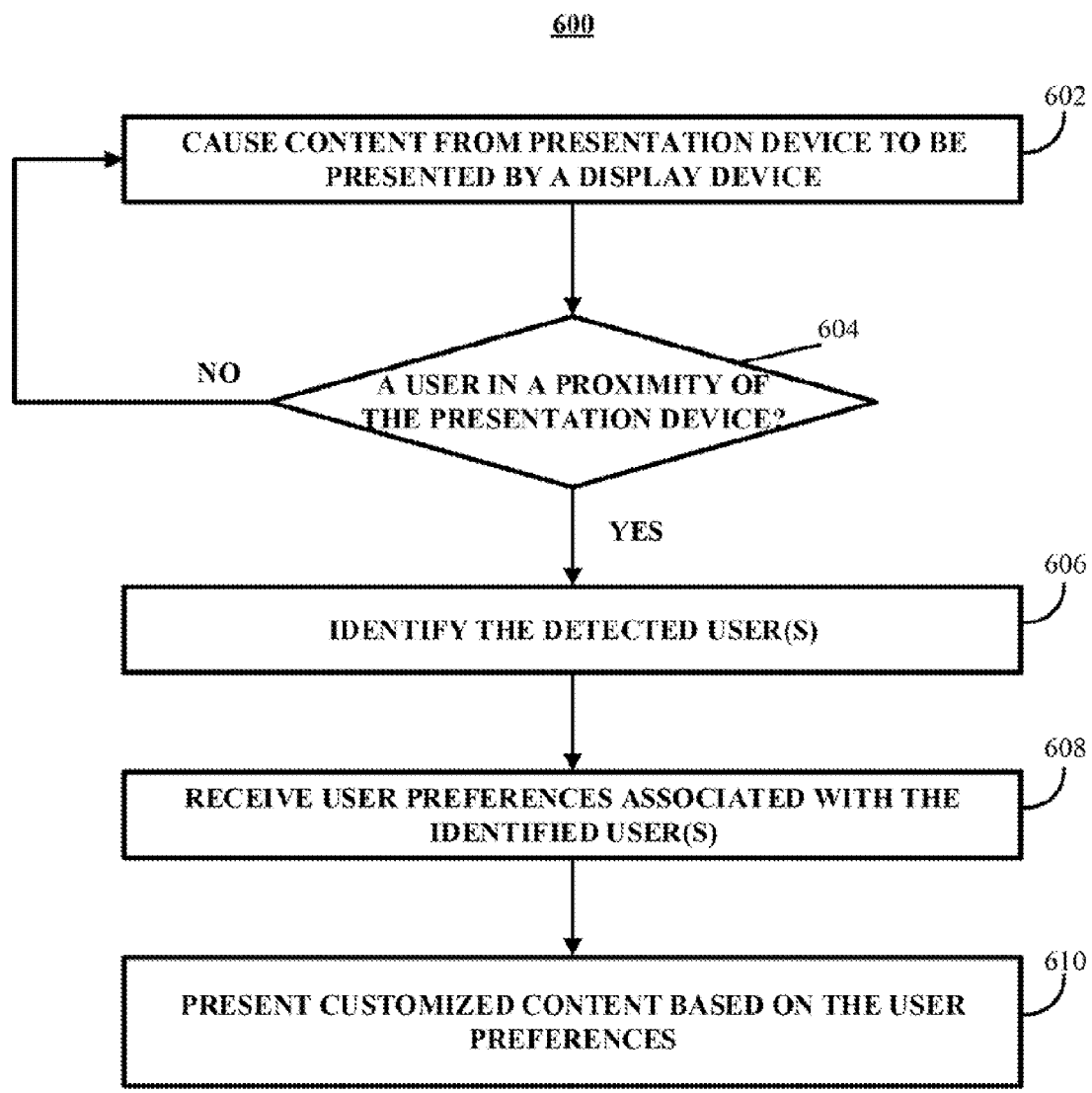
FIG. 6 shows an example of a process for presenting customized content on a presentation device in accordance with some implementations of the disclosed subject matter.

FIG. 6 shows an example 600 of a process for presenting customized content on a presentation device in accordance with some implementations of the disclosed subject matter.

As illustrated, process 600 can begin by causing content from a presentation device to be presented by a display device at 602. Note that, as described above in connection with FIGS. 1, 2 and 4, a presentation device (e.g., presentation device 110) can be operatively connected to and/or incorporated into a display device (e.g., display device 402). In some implementations, process 600 can cause content to be presented as part of 314 described above in connection with FIG. 3. In some implementations, the content can include images, video content, audio content, text, etc. For example, process 600 can present a collection of images as a slideshow of images. In some implementations, each of the images in the slideshow can be presented one at a time for a predetermined period of time (e.g., fifteen seconds, thirty seconds, etc.). In such implementations, the slideshow can include images from one source or multiple sources (e.g., a locally stored database of images, images stored on the presentation device, a server, etc.). In some implementations, the content can be presented periodically (e.g., every 15 seconds, every minute, etc.).

At 604, process 600 can determine whether a user is present in a proximity of the presentation device. For example, process 600 can detect the presence of a user by detecting one or more user devices associated with the user. In a more particular example, process 600 can detect the presence of a user device that is in a proximity of the presentation device using a BLUETOOTH Service Discovery Protocol (SDP) and/or any other suitable SDP that allows a device to discover other devices through a short-range connection. In another more particular example, process 600 can initiate device discovery on a network to which the presentation device is connected. More particularly, for example, process 600 can search for user devices on a network (e.g., a WiFi network) utilizing the Discovery And Launch (DIAL) protocol and/or any other suitable protocol.

As another example, process 600 can detect the presence of a user based on image data of the user. In a more particular example, process 600 can receive image data of the user from one or more suitable cameras. Process 600 can then detect the presence of the user using suitable object detection technique, object tracking technique, and/or any other suitable technique or combination of techniques.

In some implementations, process 600 can loop back to 602 in response to failing to detect a user in a proximity of the presentation device ("NO" at 604). Alternatively, in response to detecting the presence of one or more users in the proximity of the presentation device, process 600 can identify the detected user or users at 606. For example, process 600 can compare identifying information related to a user device associated with a detected user (e.g., a device identifier, an IP address, a URI, a MAC, etc.) to known identifying information related to known user devices that are associated with the presentation device to find a match. As another example, process 600 can identify the detected user(s) using any suitable facial recognition technique or combination of techniques. In a more particular example, process 600 can generate a set of facial features based on image data of the detected user(s) and can compare the generated facial features with known facial features of known users that are associated with the presentation device to find a match.

In some implementations, any suitable user can be considered a user associated with the presentation device. In some implementations, one or more users and/or one or more user devices associated with the user(s) can be associated with the presentation device using process 300 of FIG. 3, process 500 of FIG. 5 and/or any other suitable process.

At 608, process 600 can receive one or more user preferences associated with the identified user(s). In some implementations, upon identifying multiple users at 606, process 600 can retrieve a user preference for each of the identified users. In some implementations, the received user preferences can include any suitable information for presenting customized content using the presentation device. In some implementations, the user preferences can be received from one or more users and/or be associated with the presentation device as described above in connection with process 500 of FIG. 5 and/or in any other suitable manner.

In some implementations, identifying information of user devices and/or users identified at 606 can be grouped by process 600 using a group ID and/or any other suitable information to identify devices that are present. For example, a group ID can be used as described above in connection with 312 of FIG. 3.

At 610, process 600 can present customized content using the presentation device based on the user preferences. In some implementations, the customized content can be presented by causing any suitable media content, such as images, video content, audio content, multimedia content, text, etc., to be presented by a display device.

In some implementations, the customized content can be presented in any suitable manner. For example, process 600 can identify one or more topics in which one or more of the identified users may be interested based on the user preferences, such as a topic included in a user preference of a particular user associated with the presentation device, a common topic included in user preferences of multiple users associated with the presentation device, etc. Process 600 can then cause media content related to the identified topic(s) to be presented using the presentation device. In a more particular example, in response to determining that the user preferences associated with the identified users include a common topic of "stocks," process 600 can cause information about one or more stocks and/or news about one or more companies associated with the one or more stocks to be presented on the display device. In another more particular example, in response to determining that the user preferences indicate that the identified user(s) are interested in "personal photos," process 600 can cause photos of one or more of the identified users to be presented on the display device. In some implementations, these photos can include photos that are published by a user on a social networking service, photos that are stored in a user device associated with the users, etc.

As another example, process 600 can identify a media source associated with one or more of the identified users based on the user preferences, such as a website, a service (e.g., a video hosting service, a photo sharing service, a file sharing service, a social networking service, etc.), a device (e.g., a user device, a storage device, etc.), and/or any other suitable media source designated by one or more user preferences. Process 600 can then cause media content provided by the identified media source to be presented by the presentation device. In a more particular example, process 600 can cause media content (e.g., photos, video content, audio content, etc.) stored in a user device designated by the user preferences to be presented by the presentation device. In another more particular example, process 600 can cause media content published on a social network (social media posts, photos, videos, etc. associated with a user account of one or more of the identified users) to be presented by the presentation device.

Figure 7:
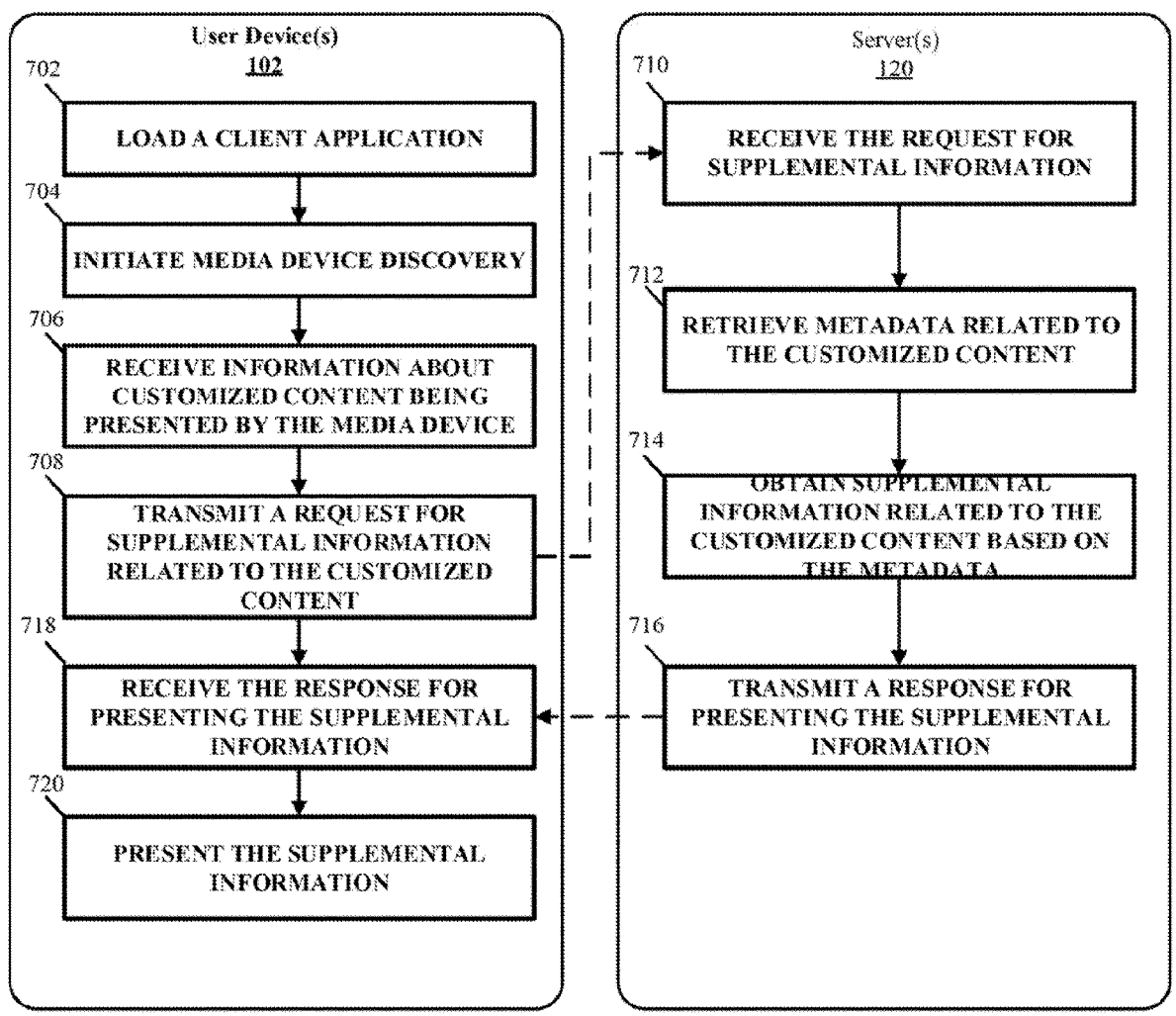
FIG. 7 shows an example of a process for presenting supplemental information related to customized content in accordance with some implementations of the disclosed subject matter.

FIG. 7 shows an example 700 of a process for presenting supplemental information related to customized content in accordance with some implementations of the disclosed subject matter. In some implementations, process 700 can be implemented using one or more user devices and servers, such as a user device 102 as shown in, and described, above in connection with FIGS. 1 and 2 and one or more servers 120 as shown in, and described, above in connection with FIGS. 1 and 2.

As illustrated, process 700 can begin by loading a client application at 702. In some implementations, the client application can be loaded on any suitable user device, such as a smartphone, a tablet computer, a wearable computer, etc. In a more particular example, the client application can be loaded on a user device 102 as described above in connection with FIGS. 1 and 2.

At 704, once the client application is loaded, the client application can initiate presentation device discovery in some implementations. For example, presentation device discovery can be initiated on a network to which the user device is connected. In a more particular example, the client application can cause user device 102 to search for presentation devices on a network (e.g., a Wi-Fi network) utilizing the Discovery And Launch (DIAL) protocol. In another more particular example, a full discovery protocol can be executed that causes the computing device to send a User Datagram Protocol (UDP) multicast message on a network to which the user device is connected. In some implementations, the UDP can include an M-Search message directed to presentation devices, such as digital media renderers and/or digital media servers, digital media players, or any other suitable presentation device that outputs, processes, and/or presents media content. In some implementations, the UDP multicast message can include an address of the device sending the message (e.g., the network address of the user device), and can include a time period during which replies are to be sent. Such a time period can be any suitable time period, such as one second, two seconds, etc., and can be set based on any suitable factors.

As another example, presentation device discovery can be initiated to determine whether presentation devices are in a proximity of user device 102. In another more particular example, the client application can execute a BLUETOOTH Service Discovery Protocol (SDP) and/or any other suitable SDP that allows a device to discover other devices through a short-range connection.

It should be noted that, prior to initiating presentation device discovery or performing any action on the user device, the client application can provide a user of user device 102 with an opportunity to provide a consent or authorization to perform actions on the user device, such as detecting presentation devices connected to the user device, retrieving user preferences associated with the user, retrieving media content associated with the user, etc. For example, upon loading the client application on the user device, the client application can prompt the user to provide authorization for retrieving user preferences associated with the user device and/or a presentation device. In a more particular example, in response to downloading the client application and/or loading the client application on the user device, the user can be prompted with a message that requests (or requires) that the user provide consent prior to performing these actions. Additionally or alternatively, in response to installing the client application, the user can be prompted with a permission message that requests (or requires) that the user provide consent prior to performing these actions.

In some implementations, upon detecting the presence of a presentation device (e.g., presentation device 110), the client application can receive information about customized content being presented by the presentation device at 706. In some implementations, the information can be received from the presentation device, a server, and/or any other suitable source.

In some implementations, the received information can include identifying information about the customized content (e.g., a content identifier, a URI, and/or any other suitable information that can be used to identify the customized content), identifying information about the presentation device, and/or any other suitable information.

At 708, the client application can transmit a request for supplemental information related to the customized content to server 120. In some implementations, the request can include the information received at 706 and/or any other suitable information.

Upon receiving the request at 710, server 120 can retrieve metadata and/or any other suitable data related to the customized content at 712. For example, based on an image in a slideshow that is currently being presented on the presentation device, server 120 can retrieve a data blob or any other suitable information about the currently presented image and use the data blob to retrieve metadata associated with the image. In some implementations, metadata related to the media content can be identified and/or retrieved based on the identifying information related to the customized content, the identifying information related to the presentation device, and/or any other suitable information.

In some implementations, the metadata can contain any suitable information relating to the customized content, such as one or more topics related to the customized content, information about the type of information contained in the customized content (e.g., an image, a video, a file type, etc.), information about the subject of the customized content (e.g., a description of what is depicted in an image), a source where the customized content originates (for example, a social media post, a web page, a URI, etc.), information about one or more users related to the customized content (e.g., a user that appears in a photo), information about one or more authors of the customized content, etc.

At 714, server 120 can obtain supplemental information related to the customized content based on the retrieved metadata. For example, the supplemental information can be obtained by performing a search based on the metadata (e.g., using the server and/or any other suitable device and/or service) and obtaining one or more search results. In a more particular example, if the customized content includes an image of a painting, the server can retrieve web pages, news articles, and/or any other suitable content related to the painting, the artist of the painting, etc., by performing a search based on the metadata related to the painting. In another more particular example, if the customized content includes a representation of a news article (e.g., an image of the news article), the server can obtain a link to the news article, a snippet of the news article and related news, and/or any other suitable information related to the news article by performing a search based on the metadata related to the representation of the news article.

At 716, server 120 can transmit a response to user device 102 for presenting the supplemental information. In some implementations, the response can include any suitable data that can be used to present the supplemental information. For example, the response can include a link (e.g., a uniform resource locator (URL)), a barcode (e.g., a quick response (QR) code), and/or any other suitable mechanism directed to a web page including supplemental information related to the customized content, etc. As another example, the metadata can include a snippet of web content (e.g., a web page, text, video, etc.) including supplemental information related to the customized content.

In some implementations, the client application can receive the response at 718. In some implementations, at 720, the client application can cause the supplemental information related to the customized content to be presented by user device 102. In some implementations, the supplementation information can be presented using text, images, icons, graphics, videos, animations, audio clips, hypertext, hyperlinks, sounds, and/or any other suitable content. In some implementations, the media content can be presented using one or more content items as described above in connection with FIG. 4.

In some implementations, the mechanisms described herein can include software, firmware, hardware, or any suitable combination thereof. For example, the mechanisms described herein can encompass a computer program written in a programming language recognizable by one or more of hardware processors 202, 212 and 222 (e.g., a program written in a programming language, such as, Java, C, Objective-C, C++, C#, Javascript, Visual Basic, or any other suitable approaches). As another example, the mechanisms described herein can encompass code corresponding to one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches).

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 3 and 5-7 can be executed or performed in any order or sequence not limited to the order and sequence shown and described in the figures. Also, some of the above steps of the process of FIGS. 3 and 5-7 can be executed or performed substantially simultaneously where appropriate or in parallel to reduce latency and processing times.

It should also be noted that, as used herein, the term mechanism can encompass hardware, software, firmware, or any suitable combination thereof.

Accordingly, methods, systems, and media for associating multiple users with a media presentation device are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for determining content to be presented, the method comprising:
   receiving, using a hardware processor of a media presentation device, first user preferences associated with a first user of a first user device in proximity of the media presentation device and second user preferences associated with a second user of a second user device in proximity of the media presentation device;
   receiving, from the first user device, a request to associate the first user preferences with the media presentation device and receiving, from the second user device, a request to associate the second user preferences with the media presentation device, wherein a third user having a third user device is in proximity of the media presentation device and is associated with third user preferences and wherein a request to associate the third user preferences with the media presentation device has not been received from the third user device;
   in response to the request to associate the first user preferences with the media presentation device and in response to the request to associate the second user preferences with the media presentation device, causing the first user preferences and the second user preferences to be associated with identifying information of the media presentation device;
   determining that the first user preferences and the second user preferences indicate that the first user and the second user are interested in viewing photos associated with one or more users;
   receiving, from the media presentation device, a request to present a slideshow of images based on user preferences associated with the media presentation device;
   identifying, based on the first user preferences, a plurality of photos posted to a social networking site by the first user device, wherein the slideshow of images include the plurality of photos posted to the social networking site;
   selecting a subset of photos from the plurality of photos posted on the social networking site that include the first user and the second user and do not include the third user; and
   in response to the request to present the slideshow of images, causing the slideshow of images to be presented by the media presentation device to users of the first user device, the second user device, and the third user device that are in the proximity of the media presentation device, wherein the subset of photos including the first user and the second user and not including the third user are contained in the slideshow of images.

2. The method of claim 1, further comprising:
   receiving, from the media presentation device, identifying information of the second user device; and
   in response to receiving the identifying information of the second device, determining that the second user preferences are associated with the media presentation device.

3. The method of claim 2, further comprising:
   generating a group identifier;
   associating the group identifier with the first device and the second device;
   generating combined user preferences based on the first user preferences and the second user preferences;
   associating the combined user preferences with the group identifier; and
   wherein causing the content to be presented by the media presentation device further comprises causing the content to be presented by the media presentation device based on the combined user preferences.

4. The method of claim 3, further comprising:
   receiving an indication that the second user device is no longer in proximity to the presentation device; and
   in response to receiving the indication, inhibiting use of the combined user preferences in determining which content is to be presented.

5. The method of claim 1, further comprising:
   receiving, from the second user device, a request to disassociate the second user preferences from the media presentation device;
   receiving, from the media presentation device, identifying information of the second user device; and in response to receiving the identifying information of the second user device, determining that there are not user preferences associated with the second user device associated with the media presentation device.

6. The method of claim 1, further comprising:
receiving, from the first user device, a request to associate the first user preferences with a second media presentation device;
in response to the request to associate the first user preferences with the second media presentation device, causing the first user preferences to be associated with identifying information of the second media presentation device;
receiving, from the second media presentation device, a request to present a slideshow of images based on user preferences associated with the second media presentation device;
receiving, from the second media presentation device, identifying information of the first user device;
in response to receiving the identifying information of the first device, determining that the first user preferences are associated with the second media presentation device; and
causing content to be presented by the media presentation device based on user preferences associated with the media presentation device including the first user preferences.

7. The method of claim 1, wherein the first user preferences indicate one or more topics of interest.

8. A system for determining content to be presented, the system comprising:
a hardware processor that is programmed to:
receive first user preferences associated with a first user of a first user device in proximity of a media presentation device and second user preferences associated with a second user of a second user device in proximity of the media presentation device;
receive, from the first user device, a request to associate the first user preferences with the media presentation device and receiving, from the second user device, a request to associate the second user preferences with the media presentation device, wherein a third user having a third user device is in proximity of the media presentation device and is associated with third user preferences and wherein a request to associate the third user preferences with the media presentation device has not been received from the third user device;
in response to the request to associate the first user preferences with the media presentation device and in response to the request to associate the second user preferences with the media presentation device, cause the first user preferences and the second user preferences to be associated with identifying information of the media presentation device;
determine that the first user preferences and the second user preferences indicate that the first user and the second user are interested in viewing photos associated with one or more users;
receive, from the media presentation device, a request to present a slideshow of images based on user preferences associated with the media presentation device;
identify, based on the first user preferences, a plurality of photos posted to a social networking site by the first user device, wherein the slideshow of images include the plurality of photos posted to the social networking site;
select a subset of photos from the plurality of photos posted on the social networking site that include the first user and the second user and do not include the third user; and
in response to the request to present the slideshow of images, cause the slideshow of images to be presented by the media presentation device to users of the first user device, the second user device, and the third user device that are in the proximity of the media presentation device, wherein the subset of photos including the first user and the second user and not including the third user are contained in the slideshow of images.

9. The system of claim 8, wherein the hardware processor is further programmed to:
receive, from the media presentation device, identifying information of the second user device; and
in response to receiving the identifying information of the second device, determine that the second user preferences are associated with the media presentation device.

10. The system of claim 9, wherein the hardware processor is further programmed to:
generate a group identifier;
associate the group identifier with the first device and the second device;
generate combined user preferences based on the first user preferences and the second user preferences;
associate the combined user preferences with the group identifier; and
wherein causing the content to be presented by the media presentation device further comprises causing the content to be presented by the media presentation device based on the combined user preferences.

11. The system of claim 10, wherein the hardware processor is further programmed to:
receive an indication that the second user device is no longer in proximity to the presentation device; and
in response to receiving the indication, inhibit use of the combined user preferences in determining which content is to be presented.

12. The system of claim 8, wherein the hardware processor is further programmed to:
receive, from the second user device, a request to disassociate the second user preferences from the media presentation device;
receive, from the media presentation device, identifying information of the second user device; and
in response to receiving the identifying information of the second user device, determine that there are not user preferences associated with the second user device associated with the media presentation device.

13. The system of claim 8, wherein the hardware processor is further programmed to:
receive, from the first user device, a request to associate the first user preferences with a second media presentation device;
in response to the request to associate the first user preferences with the second media presentation device, cause the first user preferences to be associated with identifying information of the second media presentation device;

receive, from the second media presentation device, a request to present a slideshow of images based on user preferences associated with the second media presentation device;

receive, from the second media presentation device, identifying information of the first user device;

in response to receiving the identifying information of the first device, determine that the first user preferences are associated with the second media presentation device; and cause content to be presented by the media presentation device based on user preferences associated with the media presentation device including the first user preferences.

14. The system of claim 8, wherein the first user preferences indicate one or more topics of interest.

15. A non-transitory computer-readable medium containing computer executable instructions that, when executed by a processor, cause the processor to perform a method for determining content to be presented, the method comprising:

receiving first user preferences associated with a first user of a first user device in proximity of a media presentation device and second user preferences associated with a second user of a second user device in proximity of the media presentation device;

receiving, from the first user device, a request to associate the first user preferences with the media presentation device and receiving, from the second user device, a request to associate the second user preferences with the media presentation device, wherein a third user having a third user device is in proximity of the media presentation device and is associated with third user preferences and wherein a request to associate the third user preferences with the media presentation device has not been received from the third user device;

in response to the request to associate the first user preferences with the media presentation device and in response to the request to associate the second user preferences with the media presentation device, causing the first user preferences and the second user preferences to be associated with identifying information of the media presentation device;

determining that the first user preferences and the second user preferences indicate that the first user and the second user are interested in viewing photos associated with one or more users;

receiving, from the media presentation device, a request to present a slideshow of images based on user preferences associated with the media presentation device;

identifying, based on the first user preferences, a plurality of photos posted to a social networking site by the first user device, wherein the slideshow of images include the plurality of photos posted to the social networking site;

selecting a subset of photos from the plurality of photos posted on the social networking site that include the first user and the second user and do not include the third user; and in response to the request to present the slideshow of images, causing the slideshow of images to be presented by the media presentation device to users of the first user device, the second user device, and the third user device that are in the proximity of the media presentation device, wherein the subset of photos including the first user and the second user and not including the third user are contained in the slideshow of images.

16. The non-transitory computer-readable medium of claim 15, wherein the method further comprises:

receiving, from the media presentation device, identifying information of the second user device; and in response to receiving the identifying information of the second device, determining that the second user preferences are associated with the media presentation device.

17. The non-transitory computer-readable medium of claim 16, wherein the method further comprises:

generating a group identifier;

associating the group identifier with the first device and the second device;

generating combined user preferences based on the first user preferences and the second user preferences;

associating the combined user preferences with the group identifier; and wherein causing the content to be presented by the media presentation device further comprises causing the content to be presented by the media presentation device based on the combined user preferences.

18. The non-transitory computer-readable medium of claim 17, wherein the method further comprises:

receiving an indication that the second user device is no longer in proximity to the presentation device; and in response to receiving the indication, inhibiting use of the combined user preferences in determining which content is to be presented.

19. The non-transitory computer-readable medium of claim 15, wherein the method further comprises:

receiving, from the second user device, a request to disassociate the second user preferences from the media presentation device;

receiving, from the media presentation device, identifying information of the second user device; and in response to receiving the identifying information of the second user device, determining that there are not user preferences associated with the second user device associated with the media presentation device.

20. The non-transitory computer-readable medium of claim 15, wherein the method further comprises:

receiving, from the first user device, a request to associate the first user preferences with a second media presentation device;

in response to the request to associate the first user preferences with the second media presentation device, causing the first user preferences to be associated with identifying information of the second media presentation device;

receiving, from the second media presentation device, a request to present a slideshow of images based on user preferences associated with the second media presentation device;

receiving, from the second media presentation device, identifying information of the first user device;

in response to receiving the identifying information of the first device, determining that the first user preferences are associated with the second media presentation device; and causing content to be presented by the media presentation device based on user preferences associated with the media presentation device including the first user preferences.

21. The non-transitory computer-readable medium of claim 15, wherein the first user preferences indicate one or more topics of interest.

* * * * *